July 28, 1942.   B. S. AIKMAN   2,290,932
BRAKE AND BOOSTER APPARATUS
Filed May 31, 1940   3 Sheets-Sheet 1
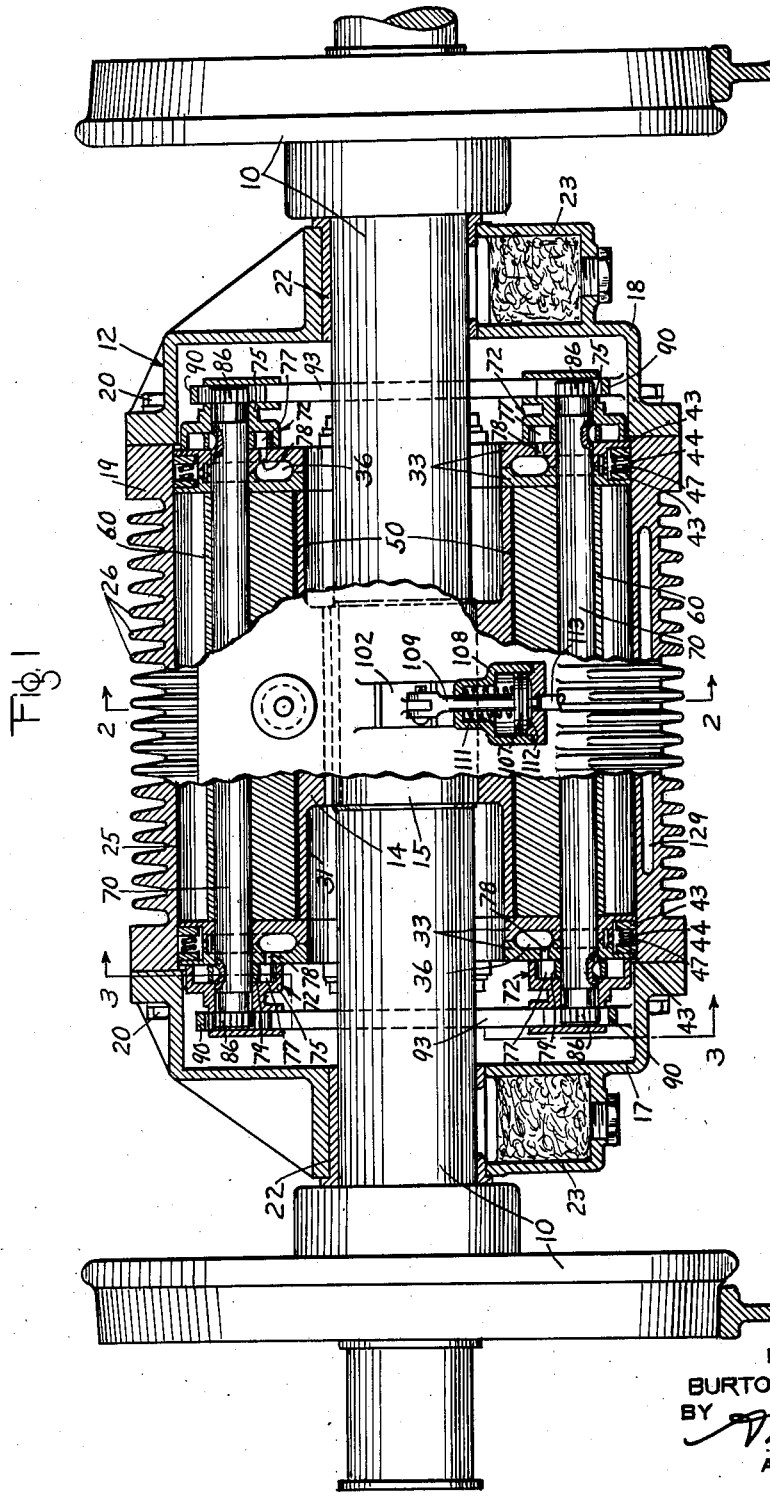
Fig. 1
INVENTOR
BURTON S. AIKMAN
BY 
ATTORNEY

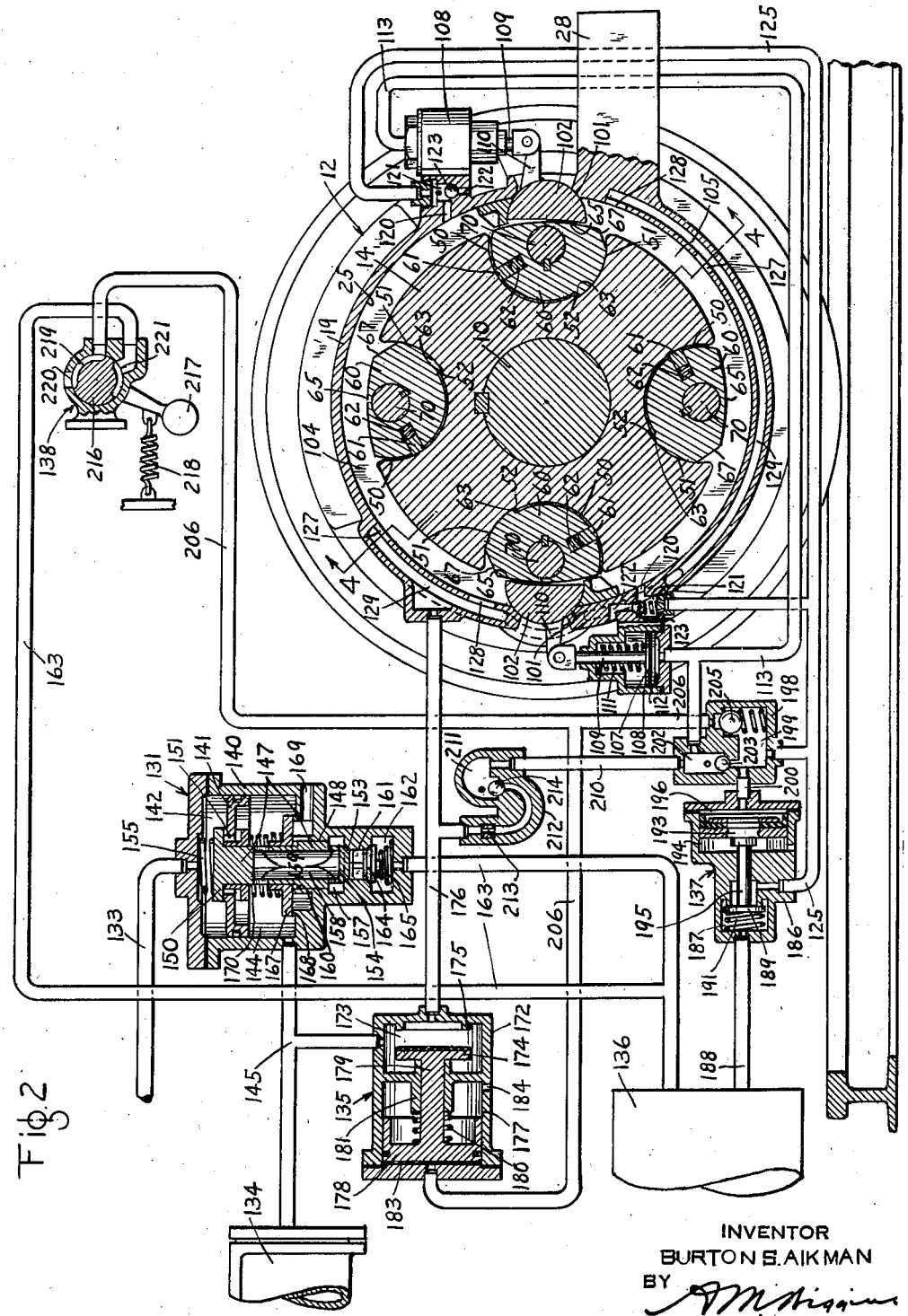

July 28, 1942.  B. S. AIKMAN  2,290,932
BRAKE AND BOOSTER APPARATUS
Filed May 31, 1940  3 Sheets-Sheet 3
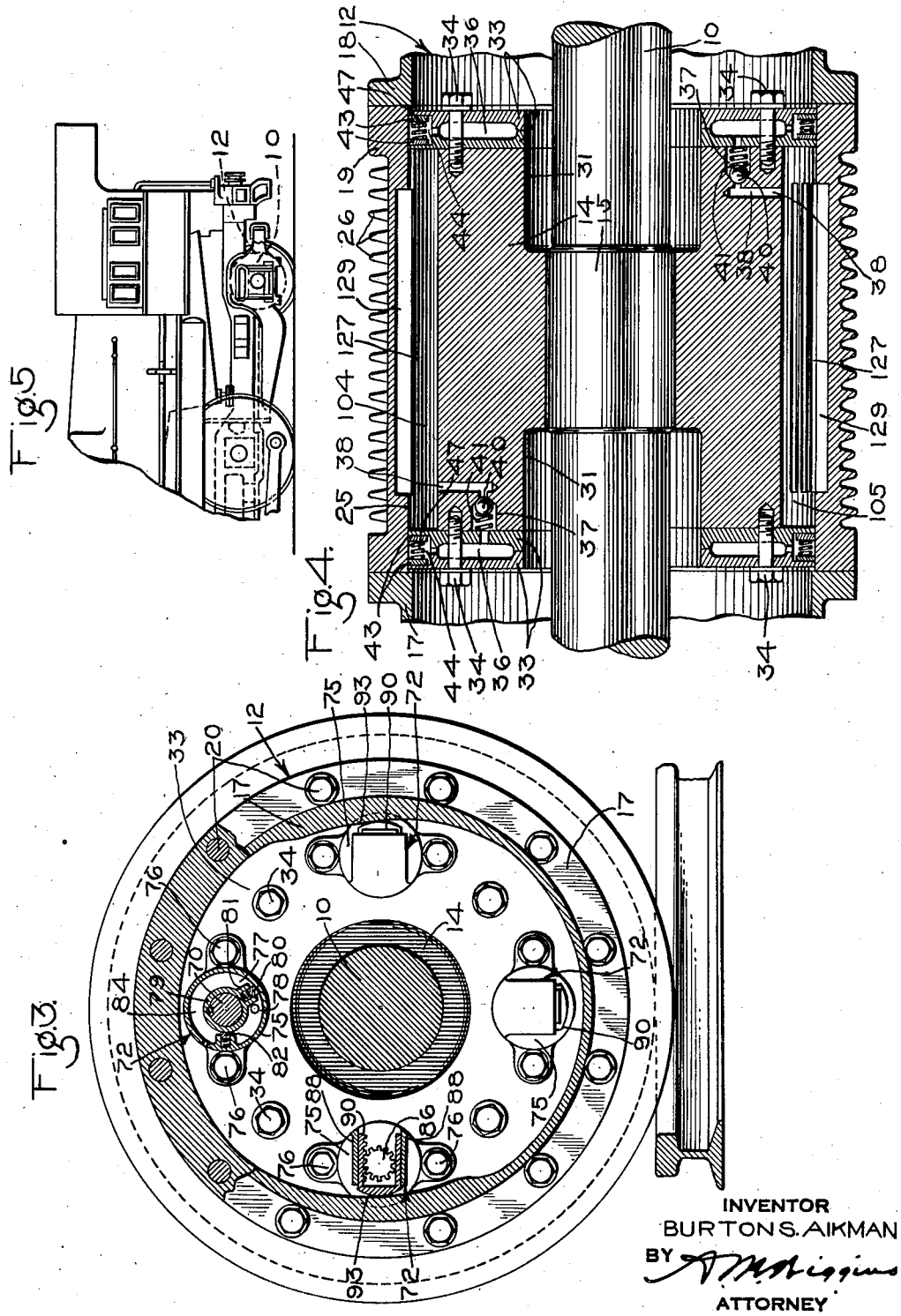
INVENTOR
BURTON S. AIKMAN
BY
ATTORNEY Patented July 28, 1942

2,290,932

UNITED STATES PATENT OFFICE 2,290,932

BRAKE AND BOOSTER APPARATUS

Burton S. Aikman, Wilkinsburg, Pa., assignor to The Westinghouse Air Brake Company, Wilmerding, Pa., a corporation of Pennsylvania Application May 31, 1940, Serial No. 338,054

12 Claims. (Cl. 192—3)

This invention relates to vehicle braking and propelling equipment, and more particularly to a combination brake and booster equipment for locomotives or the like.

Locomotive trailer trucks are sometimes equipped with air brakes and steam driven auxiliary power devices or booster engines, in order to utilize to the greatest advantage the considerable weight carried by these trucks. It is an object of my invention to provide a combination brake and booster equipment for a locomotive trailer or tender truck, comprising a fluid pressure controlled rotary engine operable at one time to apply braking force to the truck axle while storing excess energy in the form of compressed air, and operable at another time by the air thus compressed to drive the axle.

It is another object of my invention to provide an equipment of the above description which is operative while an application of the brakes is in effect to supply at least a portion of the compressed air required for the usual brake cylinders of the vehicle.

A further object of the invention is to provide a rotary fluid pressure operated engine particularly adapted for the above equipment, which may be mounted directly on the truck axle or may have a continuous driving connection therewith, and which includes a rotor member provided with movable vanes or blades constructed and arranged to assume operative positions or inoperative positions in accordance with operation of a fluid pressure controlled mechanism.

Other objects and advantages of the invention will be apparent in the following more detailed description thereof, taken in conjunction with the accompanying drawings, in which Fig. 1 is an elevational view, mainly in section, of a wheel and axle assembly equipped with a brake and booster device constructed in accordance with the invention;

Fig. 2 is a schematic sectional view of an equipment embodying my invention and showing the engine device as sectioned along the line 2—2 of Fig. 1;

Fig. 3 is an elevational, sectional view of the engine device taken substantially alonge the line 3—3 of Fig. 1;

Fig. 4 is a fragmentary sectional view taken substantially along the line 4—4 of Fig. 2; and Fig. 5 is a fragmentary elevational view of a locomotive having a trailer truck equipped with my brake and booster apparatus.

Referring to Fig. 1 of the drawings, there is illustrated a wheel and axle assembly 10, which is adapted to form part of a locomotive trailer truck as shown in Fig. 5, or may be mounted in one of the trucks of a locomotive tender. According to my invention the wheel and axle assembly 10 is arranged to carry a combination brake and booster engine indicated generally by the character 12.

The engine 12 is of the rotary type and comprises a rotor member 14 which is keyed or otherwise secured to an enlarged portion 15 of the axle 10, and a casing structure adapted to enclose the rotor member and including a pair of end casing sections 17 and 18, journaled on the axle, and a cylinder section 19, which extends between the end casing sections and is secured thereto by suitable means, such as bolts 20. Each of the similarly formed end casing sections 17 and 18 is fitted with a journal bushing 22 that is rotatably mounted on the axle 10 and is adapted to be lubricated by oil carried in a lubricant chamber 23 formed in the casing section. The centrally disposed cylinder section 19 is entirely supported by the end casing sections 17 and 18, and is provided with an interior bore 25 within which the rotor member 14 is adapted to revolve, as hereinafter explained.

A plurality of annular cooling fins 26 may be formed on the exterior surface of the cylinder casing section 19. As is shown in Fig. 2 of the drawings, this casing section also carries a projecting arm member 28 which is adapted to be secured in any suitable manner to an unsprung portion of the truck frame, not shown, in order to prevent rotary movement of the casing section.

As is best shown in Fig. 4, the rotor member 14 has interior recesses 31 formed therein at opposite sides of the portion of the central portion of the member carried by the portion 15 of the axle 10. It will be observed that the diameter of the rotor member 14 is considerably less than that of the interior surface 25 of the cylinder casing section 19, so that the peripheral surface of the rotor member is spaced from the surface 25.

Disposed at each of the opposite ends of the rotor member 14 are a pair of annular plate members 33, which are arranged concentrically of the axle 10 and cylinder casing section 19 and are secured to the rotor member by suitable means, such as bolts 34. The respective pairs of annular plate members 33 each define a substantially circular cavity 36 which is sealed from the atmosphere and communicates by way of a valve chamber 37 and passage 38 with the space or chamber between the peripheral surface of the rotor member and the cylindrical surface 25. Each of the valve chambers 27 contains a ball check valve 40 which is normally urged into seated position by a spring 41 for preventing back flow of air from the chamber 36 to the passage 38 as hereinafter explained.

The peripheral edges of the plate members 33 are closely fitted within the bore 25 of the cylinder casing section 19 but preferably do not engage said surface. For providing a leak-tight seal the respective pairs of plate members 33 are fitted with annular sealing ring elements 43, two of which are mounted in an annular groove 44 defined by each set of plate members 33. Each of the grooves 44 communicates with the associated annular chamber 36. The sealing ring members 43 are preferably formed of a self-lubricating material and have sufficient inherent resiliency to engage the surface of the bore 25 at all times. Coil springs 47 may be interposed between the adjacent sealing ring members for insuring engagement thereof with the opposite sides of the groove.

As is best shown in Figs. 1 and 2 of the drawings, the rotor member 14 has formed therein four axially or longitudinally disposed grooves or recesses 50, each of which is substantially semi-circular in conformation, and includes in addition to a major bearing surface a silghtly depressed surface 51 concentric thereto, providing a longitudinal shoulder 52, as shown in Fig. 2.

Slidably mounted in each of the four arcuate recesses 50 is a rotatable piston element or vane member 60, which is preferably formed of a self-lubricating carbonaceous material, and which has a convex sealing surface that is complementary to and adapted for sliding engagement with the bearing surface of the corresponding recess. A sealing element 61 is slidably mounted in a groove formed in each of the vanes 60, and is urged outwardly by the force of a coil spring 62. It will be noted in Fig. 2 that each of the vane members 60 is provided with an enlarged portion fitting the corresponding surface 51 formed on the rotor member 14, and that each enlarged portion provides a shoulder 63 that is engageable with the shoulder 52 when the vane member is moved to its inoperative position, as hereinafter explained. Also formed on each of the vane members 60 is a pressure surface 65 of substantially the same curvature as that of the rotor member 14, the surface 65 being adapted to lie flush with surface of the rotor member when the vane member 60 is disposed in its inoperative position, with the shoulder 63 thereof engaging the shoulder 52 of the rotor member. A bearing surface 67 is formed adjacent the surface 65 for slidable engagement with the surface 25 of casing section 19, when the rotatably mounted vane member 60 is turned into its operative position.

Each of the vane members 60 has formed therein a longitudinal bore within which is fitted a shaft 70, the central portion of which is keyed or otherwise suitably secured to the vane member and the opposite end portions of which are journaled in bores formed in the end plate members 33. Both ends of each of the shafts 70 extend outwardly of the end plate members 33 and are operatively connected to interlock actuator assemblies, each of which is indicated generally by the character 72. It will be seen that eight actuator mechanisms 72 are provided, two being associated with each shaft 70, but it will be necessary to refer to only one of these actuator assemblies for description of features common to all.

Each actuator assembly 72 comprises a casing section 75, which is secured to the adjacent end plate member 33 by means of bolts 76 (see Fig. 3), and which has formed therein an arcuate chamber 77 communicating by way of a passage 78 with the annular chamber 36, as is best shown in Fig. 1. Referring to Fig. 3, a hub element 79 is keyed to the shaft 70 and carries a spring pressed vane 80, which is slidably mounted between a pair of lugs 81 formed on the hub element. A stationary spring pressed sealing element 82 is mounted in the casing 75 for sliding engagement with the hub member 79. The vane 80 is operable by air under pressure admitted to the chamber 77 through passage 78 for rotating the hub member and shaft 70 for a purpose hereinafter pointed out. At the side of the vane 80 opposite that facing the chamber 77 there is formed a chamber 84, which is open to the atmosphere at all times.

Each shaft 70 terminates in a pinion 86, one of which is illustrated in Fig. 3, which pinion is disposed in the outermost portion of the casing section 75. Formed on the casing section on opposite sides of the pinion 86 are two parallel walls 88, between which is slidably mounted a U-shaped rack member 90, which is arranged for movement toward and away from the axle 10, as will be apparent on inspection of Fig. 3. One side portion of the rack member 90 has formed thereon a plurality of teeth operatively intermeshed with the teeth of the pinion 86, which is thereby adapted to be rotated in a clockwise direction upon inward movement of the rack member.

The four actuator mechanisms 72 mounted on each pair of end plate members 33 of the rotary engine device are arranged for operation by stationary cam means comprising two cam surfaces 93, which are formed on diametrically opposite sides of the end casing section 17 and are disposed in operative alignment with the hard-surfaced outer ends of the rack members 90. If desired, the rack members 90 may be equipped with rollers for minimizing wear as they are carried into and out of operative engagement with the two cam surfaces during operation of the engine device.

As shown in Fig. 2 of the drawings, the cylinder casing section 19 has formed therein two oppositely disposed interior grooves 101, which are adapted to receive a pair of longitudinally arranged sealing elements 102, each of which is rotatably mounted in the corresponding groove and is adapted to be tilted into and out of sealing engagement with the rotor 14 and vane members 60 carried thereby. The sealing elements 102 thus separate the space between the rotor 14 and the surface of the bore 25 into two chambers, which are designated by the reference characters 104 and 105. Means is provided for moving each of the sealing elements 102 into sealing position, comprising in each case a piston 107 slidably mounted in a casing 108 and operatively connected to the corresponding sealing member through the medium of a rod 109 which is pivotally connected to an arm 110 carried by the sealing member. One of the two casings 108 is shown in section in Fig. 2, wherein it will be seen that the piston 107 is normally urged, under the force of a spring 111 contained in a chamber 112, toward a position in which the associated sealing member 102 is held out of sealing position. The piston chambers in both of the casings 108 are connected together through the medium of a pipe 113.

According to the invention as embodied in the structure illustrated in the drawings, the rotor 14 is constructed and arranged for operation in a counterclockwise direction, as viewed in Fig. 2, so that the several vane members 60 successively enter the chamber 104 at the right and leave at the left, while the vane elements enter the lower chamber 105 at the left and move out of that chamber at the right. Adjacent the end of each of the chambers 104 and 105 into which the respective vane elements 60 are adapted to enter there is provided an inlet port 120, which communicates with the atmosphere by way of a valve chamber 121 and passage 122 formed in the casing section 19. Contained in each of the valve chambers 121 is a ball check valve 123 that is suitably biased toward seated position for preventing back flow of air from the valve chamber to the passage 122. Both valve chambers 121 are connected together by way of a pipe 125, which is always in communication through the ports 120 with the respective chambers 104 and 105.

Also formed in the cylinder casing section 19 adjacent each of the chambers 104 and 105 are discharge ports 127 and 128, each pair of discharge ports communicating with the chamber near the end thereof opposite that connected to the inlet port 120. The two sets of discharge ports 127 and 128 are open at all times to a common passageway 129 formed in the casing section 19.

Other elements of the brake and booster apparatus illustrated in Fig. 2 of the drawings include a control valve device 131 which is operated in accordance with the pressure of fluid supplied to a control pipe 133, a brake cylinder device 134, a cut-off valve device 135, a reservoir 136, a propulsion valve device 137, and a starter valve device 138. It will be understood that the several devices just mentioned are illustrated in diagrammatic form, and are in practice designed to be mounted in suitable positions on the locomotive or truck equipped with the brake and booster engine device 12. It should further be understood that the locomotive equipped with the brake and booster apparatus shown in the drawings is also provided with a fluid pressure brake controlling system of a suitable design, only two elements of which are illustrated in Fig. 2, namely, the control pipe 133 and the brake cylinder device 134. The control pipe 133 is adapted to be connected to the supply port of a brake controlling valve device, not shown, which is constructed and arranged to supply fluid at any desired pressure thereto in effecting an application of the brakes.

The control valve device 131 comprises a casing 140 within which is slidably mounted a piston valve element 141 having formed at one side thereof a chamber 142 communicating with the control pipe 133, and at the opposite side a chamber 144 that is connected by way of a pipe 145 with the usual piston chamber of the brake cylinder device 134. The piston valve element 141, which has a central bore, is slidably mounted on the upper end of a hollow plunger member 147, the other end of which is slidably mounted in a bore 148 formed in the casing 140. The end of the plunger member 147 adjacent the piston valve 141 has formed thereon an enlarged seat portion 150, which is adapted to be engaged by the central portion of the piston valve element for closing plurality of ports 151, which ports are formed in the latter element to establish communication between the chambers 142 and 144 when the piston valve element is moved away from the seat portion 150.

The end of the plunger member 147 opposite the enlarged portion 150 terminates in a valve portion 153, which is adapted to be held in engagement with a seat 154 formed in the casing under the force exerted by a coil spring 155 interposed between the enlarged portion 150 and the upper wall of the chamber 142. The valve portion 153 is disposed within a valve chamber 157 communicating with the chamber 144 by way of an interior bore 158 and suitable apertures 159 formed in the plunger member 147, and is arranged to control communication from the chamber 157 through a bore 161 and valve chamber 162, formed in the casing, with a pipe 163 leading to the reservoir 136. A check valve 164 is mounted in the chamber 162 and is urged into seated position under the force of a spring 165 for preventing back flow of air under pressure from that chamber to the bore 161.

Disposed within the chamber 144 and slidably mounted on the plunger element 147 is a discharge valve disk 167, which is adapted to engage an annular seat rib 168 for controlling communication from the chamber 144 to an atmospheric exhaust passage 169, the valve disk being normally held in seated position under the force of a coil spring 170 which is interposed between the valve disk and the piston valve element 141. It will be understood that the spring 170 is designed to exert considerably less force than that of the spring 155 acting on the plunger member 147.

The cut-off valve device 135 comprises a casing 172 having a valve chamber 173 which communicates with the pipe 145 and contains a valve 174 that is engageable with a seat rib 175 for controlling communication between the valve chamber and a pipe 176 leading to the passageway 129 of the engine device 12. Also formed in the casing 172 is a piston bore 177, in which is slidably mounted a piston 178 that is operatively connected by means of a rod 179 with the valve 174. The piston 178 is normally maintained in a position for holding the valve 174 out of engagement with the seat rib under the force of a light spring 180 interposed between the piston and a sleeve portion 181 formed on the casing. Formed adjacent the pressure face of the piston 178 is a chamber 183, to which fluid under pressure may be admitted as hereinafter explained for causing the piston to move the valve 174 to seated position. It will be noted that the end of bore 177 at the side of the piston subject to spring pressure is open to the atmosphere by way of a port 184.

The propulsion valve device 137 comprises a casing 186 having formed therein a valve chamber 187 which communicates by way of a pipe 188 with the reservoir 136 and has mounted therein a valve 189 for controlling communication between the chamber 187 and the pipe 125 already mentioned. The valve 189 is normally maintained in a seated position as shown in the drawing by the force of a coil spring 191 mounted within the chamber 187. The spring is adapted to yield for permitting unseating of the valve upon operation of a piston 193 that is operatively mounted in a bore 194 and is connected with the valve by means of a piston stem 195. The piston 193 is subject to pressure of air in a chamber 196 formed in the casing 186.

Mounted adjacent the propulsion valve device 137 is a check valve casing 198, in which are formed a valve chamber 199 communicating with pipe 125 and by way of a conduit 200 with the piston chamber 196, and a valve chamber 202 communicating with the pipe 113. A ball check valve 203 is disposed in the valve chamber 202 for preventing back flow of air from that chamber to valve chamber 199. A spring-pressed ball check valve 205 is likewise mounted within the valve chamber 199 for controlling a communication thereto from a pipe 206, one branch of which communicates with the piston chamber 183 of the cut-off valve device 135.

The valve chamber 202 in the casing 198 also communicates by way of a pipe 210 with a valve chamber 211 formed in a check valve casing 212, which chamber communicates by way of a passage including a restricted portion 213 with the pipe 176, and contains a ball check valve 214 adapted to prevent back flow of air under pressure from the valve chamber to the passage 213.

The starter valve device 138 shown in Fig. 2 of the drawings comprises a casing having a bore within which is mounted a rotary valve element 216, which is adapted to be manually actuated by means of a handle 217 and is normally held in an inoperative position under the force exerted by spring 218 or other suitable biasing means. The valve element 216 has formed therein a cavity 219, which is arranged to maintain communication between the pipe 206 and an atmospheric port 220 when the valve element is maintained in its normal position as shown in the drawing. Another cavity 221 is formed in the valve element 216 for establishing communication between the pipe 206 and the pipe 163 upon movement of the handle 217 to operative position as hereinafter explained.

*Operation for braking*

In the drawings the various elements of the brake and booster apparatus are illustrated in their respective inoperative or coasting positions, it being understood that the associated fluid pressure brake controlling valve means is at the same time held in release position. Referring to Fig. 2, it will thus be apparent that the control pipe 133 is connected with the atmosphere through the medium of the locomotive brake controlling valve device, not shown. It will now be assumed that the locomotive is traveling along the track toward the left, as viewed in Fig. 2, so that the wheel and axle assembly 10 and rotor 14 of the brake and booster engine 12 are revolving in a counterclockwise direction. If the engineer actuates the usual brake valve device, not shown, to initiate an application of the brakes, air under pressure is consequently supplied to the control pipe 133 and to the connected chamber 142 of the control valve device 131, the pressure of air thus supplied being predetermined in accordance with the desired degree of application of the brakes.

The pressure of air supplied to the piston chamber 142 acts on the piston valve element 141 to overcome the opposing force of the spring 170 and quickly moves the element away from the seat portion 150 of the stem 147, whereupon air under pressure flows from the piston chamber through the apertures 151, the chamber 144, and pipe 145 to the brake cylinder device 134, which is thereby operated to initiate application of braking force to the locomotive wheels. At the same time, fluid under pressure flows from the pipe 145 through the chamber 173 of cut-off valve device 135, past the unseated valve 174, and through pipe 176 to the passageway 129 in the rotary engine device 12 carried by the trailer axle 10. From the passageway 129 the air is free to flow through the two pairs of ports 127 and 128 to the chambers 104 and 105, respectively. These chambers 104 and 105 are meanwhile sealed or isolated from each other by reason of movement of the two sealing elements 102 to their sealing positions, these elements being thus operated by means of the pistons disposed in the casing 108 in response to the pressure of air supplied from pipe 176 by way of the restricted passage 213, past ball check valve 214, and through chamber 211, pipe 210, chamber 202, and pipe 118 to the respective piston chambers.

Referring to Fig. 4 of the drawings, air under pressure continues to flow from the passageway 129 to the separate chambers 104 and 105, and thence by way of the respective passages 38 and past ball check valves 40 to the annular chambers 36 defined by the end wall plate members 33 mounted on each end of the rotor member 14.

Referring to Figs. 1 and 3, air under pressure continues to flow from the annular chambers 36 through the ports 78 to the chambers 77 of the rotary vane actuator devices 72, so that each of the vanes 80 is thus subjected to fluid pressure tending to rotate the shaft 70 in a counterclockwise direction, as viewed in Fig. 3. It has already been stated that the axle 10 and rotor 14 and the elements mounted thereon are at this time revolving in a counterclockwise direction, and it will thus be apparent that the fluid pressure in each of the chambers 77 becomes effective to move the vane 80 and shaft 70 in a counterclockwise direction so long as the associated rack member 90 is traveling between the two cam surfaces 93, the rotary vane member 60 being thereby positioned in sealing engagement with the surface 25 shown in Fig. 2. As each of the rack elements 90 is brought into engagement with one of the cam surfaces 93, however, the rack member is forced inwardly, as viewed in Fig. 3, thus rotating the pinion portion 86 of the associated shaft 70 in a clockwise direction against the force of the fluid pressure opposing such movement, while the associated vane element 60 (see Fig. 2) is at the same time turned into its inoperative position with the surface 65 thereof flush with the peripheral surface of the rotor member 14 for passing under the adjacent sealing member 102.

It will be understood that the rotary engine device 12 is thus rendered operative as a fluid compressor within a very short interval of time following the initial supply of air under pressure to the control pipe 133. As the wheel and axle assembly 10 and the rotor member 14 and vane members 60 carried thereby continue to revolve in a counterclockwise direction, as viewed in Fig. 2, air is drawn from the atmosphere through the two passages 122, past the respective ball check valves 123 and through the ports 120 into the chambers 104 and 105 at the trailing sides of the vane members, each of which is so constructed and arranged as to uncover the port 127 immediately after the following vane member has closed the port 120, the air trapped in the chamber 104 or 105 being then discharged therefrom by way of the passage 129, the pipe 176, and thence to the brake cylinder device 134. The supply of air under pressure required for effecting the application of the brakes is thus continued by operation of the engine device 12 as a compressor, the total braking effect produced being the sum of the braking force exerted through operation of the brake cylinder device 134 and the retarding or reactive force due to back pressure of air opposing rotation of the rotor element 14 of the engine device 12.

The pressure of air supplied by operation of the engine device 12 as a compressor as just explained is quickly built up in the brake cylinder device 134 and in the chamber 144 of the control valve device 131 until the pressure in the latter chamber becomes slightly greater than that of the air supplied from the control pipe 133 to the piston chamber 142, whereupon the piston valve element 141 is moved upwardly into seating engagement with the seat portion 150 of the stem 147, thereby closing the ports 151. At this time the pressure of air in the brake cylinder device 134 thus substantially corresponds with the predetermined fluid pressure in the control pipe 133, so that the fluid pressure brakes are maintained applied with the desired braking force.

Assuming that the application of the brakes has been initiated during operation of the locomotive at a fairly high speed, and that the usual time interval is thus required for decelerating the locomotive, the continued operation of the engine device 12 by the trailer axle 10 consequently causes further increase in the pressure of air supplied to the chamber 144 until the piston valve element 141 and the stem 147 engaged therewith are moved upwardly against the opposing force of the spring 155 and of air pressure in the chamber 142. On upward movement of the stem 147 the valve portion 153 thereof is lifted out of engagement with the seat 154, thereby establishing a communication from the chamber 144 by way of the apertures 159 and the bore 158 of the stem, the chamber 157, bore 161, past the check valve 164, and through the chamber 162 and pipe 163 to the reservoir 136. It will thus be seen that the reservoir 136 is gradually charged with air compressed by operation of the engine device 12 in effecting an application of the brakes.

While the pressure of air in the reservoir 136 remains lower than that of the air in the chamber 144 the flow of air from the chamber to the reservoir will continue, so that the fluid pressure in the chamber 144 and in the brake cylinder device 134 is thus prevented from rising above the predetermined desired value. In the event that the time required for the application of the brakes should be such that the engine device 12 is operated to supply air under pressure by way of the chamber 144 to the reservoir 136 until the pressure of air in the reservoir equals that in the chamber, further supply of air to the chamber 144 then effects a slight rise in the pressure therein for further moving the piston valve element 141 and the stem 147 upwardly, the enlarged portion 160 of the stem being thereby brought into unseating engagement with the valve disk 167. When the valve disk 167 is thus unseated, fluid under pressure is vented from the chamber 144 by way of the passage 169 until the pressure of air in the chamber again becomes substantially equal to that in the control pipe and in piston chamber 142. It will be understood that such venting of air under pressure from the chamber 144 is effected at a slow rate so that the brake cylinder pressure will not be appreciably reduced at the same time.

When it is desired to effect the release of the brakes, the usual brake controlling valve apparatus with which the locomotive is equipped is rendered operative to vent air under pressure from the control pipe 133 and chamber 142 of the brake control valve device 13, whereupon the pressure of air in the chamber 144 forces the piston valve element 141 and stem 147 to their uppermost position for unseating the valve disk 167 to permit rapid venting of air under pressure from the brake cylinder device 134 by way of the chamber 144 and exhaust passage 169. With the piston chamber 142 thus vented to the atmosphere, only the spring 155 remains effective to exert downward pressure on the stem 147 opposing the upward pressure of air on the piston valve element 141, with the result that the valve disk element 167 is maintained in unseated position until the air pressure in the chamber 144 and in the brake cylinder device 134 is reduced to a degree permitting complete release movement of the usual brake cylinder piston (not shown) by the spring associated therewith. Check valve 164 retains in reservoir 136 the pressure established therein.

It will be noted that air under pressure is also vented from the chambers 104 and 105 of the engine device 12 at this time, the air flowing therefrom by way of the pipe 176, past the unseated valve 174 and through the chamber 173 and the other communications leading to the atmosphere hereinbefore mentioned. With the further supply of air under pressure to each of the several chambers 77 shown in Fig. 3 thus discontinued, any air under pressure entrapped therein will within a short interval leak to the atmosphere, thus relieving the vanes 80 and shaft 70 of air pressure tending to rotate those elements into their operative positions as hereinbefore explained.

*Operation for propelling*

When the reservoir 136 has become charged with air under pressure as already explained, the brake and booster apparatus may be subsequently operated to impart driving force to the wheel and axle assembly 10 of the locomotive trailer truck, for thereby augmenting, for a limited time, the tractive effort produced by the locomotive. The engineer may initiate operation of the engine device 12 as a booster by moving the handle 217 of the starter valve device 138 from inoperative to operative position against the opposing force of the spring 218, so that the cavity 221 in the valve element 216 is brought into registration with the port leading to the pipe 206, which is then in communication with the pipe 163. Air under pressure is then supplied from the reservoir 136 through the pipe 163 and the pipe 206 to the piston chamber 183 of the cutoff valve device 135, the piston 178 of which is consequently shifted against the force of the spring 180 to move the valve 174 into engagement with the seat rib 175.

Air under pressure also flows from the pipe 206 past the ball check valve 205 to the chamber 199 in check valve casing 198, and thence by way of pipe 200 to the piston chamber 196 of the propulsion valve device 137, thereby causing movement of the piston 193 and stem 195 to the left for unseating the valve 189 against the opposing force of the spring 191 and the air pressure in chamber 187. With the valve 189 thus unseated, air under pressure is supplied from the reservoir 136 by way of the pipe 188 and valve chamber 187 to the pipe 125, from which a portion of the air is free to flow through the chamber 199 to piston chamber 196 for maintaining piston 193 in the valve opening position to which it has just been moved.

Meanwhile, air under pressure supplied to the valve chamber 199 flows therefrom past the ball check valve 203 and through valve chamber 202 and pipe 113 to the piston chamber 112 of each of the actuator casings 108, the elements of which are thereby operated to move the sealing elements 102 of the engine device 12 into sealing position.

At the same time air under pressure flows by way of the pipe 125 through each of the ports 120 formed in the casing 19 into the respective chambers 104 and 105, it being remembered that the outlet from these chambers by way of the passageway 129 and 176 is now closed by the cut-off valve 174. Upon the supply of air under pressure to the chambers 104 and 105, the fluid pressure responsive operating means associated with the four vane members 60 are quickly actuated in the manner hereinbefore explained to bias each of the vane members toward its operative position, with the result that each vane member is conditioned for rotation in sealing engagement with the surface 25 when positioned between the opposite sealing elements 102.

The initial operation of the various elements of the brake and booster apparatus in response to operation of the starter valve device 138, as just described, requires only a few moments for completion, and with the engine device 12 now conditioned to function as a driving engine the engineer may release the handle 217 of the starter valve device. The spring 218 is then permitted to effect rotation of the valve element 216 to bring the discharge cavity 219 into registration with the port of the pipe 206, which, together with the piston chamber 183 of the cut-off valve device, is thereby vented to the atmosphere. The spring 180 of the cut-off valve device is thus rendered effective to shift the piston 178 and stem 179 to the left for unseating the valve 174, thereby reestablishing communication between the pipe 176 and the pipe 145.

Upon the supply of air under pressure to each of the ports 120 to the respective chambers 104 and 105 of the engine device 12, the trailing side of each of the operatively positioned vane members 60 is subjected to fluid pressure, so that a torque is imparted to the rotor member 14 and the wheel and axle assembly 10 tending to cause rotation thereof in a counterclockwise direction. Assuming that the main driver wheels of the locomotive are this time operated in the usual manner to move the locomotive in in a forward direction, the action of compressed air supplied from the reservoir 136 in effecting counterclockwise rotation of the rotor member 14 of the engine device 12 is thus utilized to increase the total tractive effort available for propelling the locomotive, it being understood that air under pressure admitted to the chambers 104 and 105 as just explained exerts operating force against each of the vane eelments 60 during traverse thereof through the chamber until the following vane element is brought into closing relation with the port 120. The expanded air is then exhausted from each chamber by way of the passageway 129, pipe 176, chamber 173 of the cut-off valve device and pipe 145 to the chamber 144 of the valve device 131, where the pressure of the exhaust air effects upward movement of the piston 141 against the opposing force of the spring 165 for unseating the valve disk 167, thereby establishing communication from the chamber to the atmospheric port 169.

It should be understood that, although the pressure of the exhaust air is at the same time transmitted by way of the pipe 145 to the brake cylinder device 134, the pressure will be below that required for operating the brake cylinder device, which is thus maintaintd in release position. Operation of the engine device 12 as a booster for propelling the locomotive may thus be continued for an interval of time determined by the volume of air under pressure stored in the reservoir 136 during previous periods in the engine device was operated as a braking means.

From the foregoing it will be evident that my invention provides a brake and booster apparatus constructed and arranged for association with a locomotive trailer truck of the type not usually equipped with driving and braking means, and may be rendered operative at one time to supplement the braking effect normally produced by the usual air brake system, and at another time to utilize at least a portion of the energy expended in effecting an application of the brakes for temporarily increasing the tractive power available for propelling the locomotive.

Although a preferred embodiment of my invention has been illustrated and described, it is not intended to limit the scope thereof to that embodiment or otherwise than by the terms of the appended claims.

Having now described my invention, what I claim as new and desire to secure by Letters Patent, is:

1. A combination braking and propelling apparatus for a vehicle comprising a reservoir adapted to contain fluid under pressure, and an engine device operatively connected with a wheel of the vehicle and constructed and arranged for operation at one time by said wheel to force fluid under pressure into said reservoir for thereby applying a braking force to said wheel, and for operation at another time by fluid under pressure supplied to said device from said reservoir for applying driving torque to said wheel.

2. A combination braking and propelling apparatus for a vehicle comprising a reservoir, and a fluid pressure engine device operatively connected with a wheel of the vehicle and operative at one time to force fluid into said reservoir under pressure for applying a braking force to said wheel, and operative at another time by fluid previously subjected to pressure in said reservoir for applying driving torque to said wheel.

3. Braking and propelling apparatus for a vehicle comprising rotary means operatively connected with a wheel thereof and constructed and arranged for operation either as a compressor for producing braking force or as a driving engine for said vehicle, braking control valve means responsive to an increase in fluid pressure for conditioning said rotary means for operation as a compressor and to a decrease in fluid pressure for rendering said rotary means ineffective, propulsion valve means operable to supply fluid under pressure to said rotary means for causing operation thereof as a driving engine, and manually controlled starter means for actuating said propulsion means.

4. A combination brake and booster equipment adapted for association with the axle of a locomotive trailer truck, comprising a fluid pressure engine device including a casing having pressure chambers and normally inoperative rotor means operatively mounted therein, said rotor means having driving connection with said axle, conditioning means responsive to an increase in fluid pressure to render said rotor means operative, fluid pressure operated brake means, brake control valve means operable at one time to supply fluid under pressure to said conditioning means for rendering said fluid pressure engine operative by said axle to supply fluid under pressure to said fluid pressure operated brake means, and propulsion valve means operable at another time to supply fluid under pressure to said conditioning means and to said pressure chambers for causing said rotor means to exert driving force on said axle.

5. A fluid pressure braking and propelling apparatus adapted for association with an axle of a vehicle, comprising a stationary casing, rotor means operatively connected to said axle and rotatably mounted within said casing, a reservoir, brake control means for rendering said rotor means operable by said axle to force fluid under pressure into said reservoir, and propulsion control means for rendering said rotor means operable by fluid under pressure supplied from said reservoir to exert driving torque on said axle.

6. A fluid pressure braking and propelling apparatus adapted for association with an axle of a vehicle, comprising a stationary casing having a fluid pressure chamber, rotor means mounted for rotation in said chamber and operatively connected to said axle, fluid pressure braking means, a reservoir, brake control means operable to condition said rotor means for supplying fluid at a predetermined pressure to said fluid pressure brake means and to said reservoir, and propulsion control means for rendering said rotor means operable by fluid under pressure supplied from said reservoir to exert driving force on said axle.

7. A combination brake and booster apparatus adapted for association with the axle of a locomotive trailer truck, comprising a stationary casing having a pressure chamber, normally inoperative rotary piston means mounted in said chamber in driving relation with said axle, means responsive to fluid pressure in said chamber for conditioning said rotary piston means for operation either to compress fluid when driven by said axle or to react to fluid under pressure for driving said axle, fluid pressure brake means, a reservoir, a control valve device responsive to a brake control pressure for initiating the supply of fluid under pressure to said pressure chamber and to said fluid pressure brake means, said control valve device being operative when a predetermined fluid pressure is established in the brake means to supply fluid compressed by said rotary piston means to said reservoir, and other control means operative to supply fluid under pressure from said reservoir to said pressure chamber for exerting driving force on said rotary piston means.

8. A brake and booster apparatus constructed and arranged for association with an axle of a locomotive trailer truck, comprising brake control means, propulsion control means, and a fluid pressure engine device responsive at different times to one or the other of said control means, said device comprising a casing structure journaled on said axle and having a pressure chamber, rotor means mounted on said axle for rotation within said chamber, retractile vane elements mounted on said rotor means and movable to operative positions for reacting with fluid compressed in or supplied under pressure to said pressure chamber, and fluid pressure operative means subject to the pressure of fluid in said chamber for controlling movement of said vane elements to their operative positions.

9. In a fluid pressure brake and propulsion engine device of the class described, in combination, a stationary casing structure having a cylindrical bore, a rotor member having a diameter smaller than that of said bore and operatively mounted in concentric relation therewith, a plurality of equally spaced retractile vane elements rotatably mounted on said rotor member, actuator means responsive to the pressure of fluid within said bore for biasing said vane elements into sealing engagement with the wall of said bore, sealing elements mounted in said casing at opposite sides of said bore and engageable with said rotor member for dividing the space within said bore into separate pressure chambers, cam means carried by said casing and cooperative with said actuator means for retracting each of said vane elements during passage thereof from one chamber to the other, and communication means controlling the supply and release of fluid under pressure to and from said chambers.

10. Braking and propelling apparatus for a vehicle, comprising rotary means operatively connected with a wheel thereof and constructed and arranged for operation either as a compressor for producing braking force or as a driving engine for said vehicle, a reservoir, brake control valve means operative to condition said rotary means for operation to force fluid under pressure into said reservoir, fluid pressure responsive propulsion valve means operative to supply fluid under pressure from said reservoir to said rotary means for conditioning same as a driving engine, starter valve means manually operable to effect initial supply of fluid under pressure to said propulsion valve means, and means subject to the pressure of fluid thereby supplied from said reservoir to said rotary means for maintaining said propulsion valve means in operative condition.

11. Fluid pressure braking and propelling apparatus adapted for association with an axle of a vehicle, comprising a stationary casing, rotor means operative by said axle and rotatably mounted within said casing, said rotor means being constructed and arranged for operation either as a compressor for producing braking force or as a driving engine for said vehicle, fluid pressure brake means, a reservoir, brake control valve means operative in effecting an application of the brakes first to supply fluid compressed by said rotor means to said fluid pressure brake means for effecting a predetermined increase in pressure therein, and then to feed fluid compressed by said rotor means to said reservoir, and propulsion valve means operable at another time to effect driving operation of said rotor means under the pressure of fluid supplied from said reservoir.

12. Fluid pressure braking and propelling apparatus adapted for association with an axle of a vehicle, comprising a stationary casing, rotor means operative by said axle and rotatably mounted within said casing, said rotor means being constructed and arranged for operation either as a compressor for producing braking force or as a driving engine for said vehicle, fluid pressure brake means, a reservoir, brake control valve means operative in effecting an application of the brakes first to supply fluid compressed by said rotor means to said fluid pressure brake means for effecting a predetermined increase in pressure therein, and then to feed fluid compressed by said rotor means to said reservoir, means included in said brake control valve means for effecting release of fluid under pressure from said brake means while preventing loss of fluid from said reservoir, and propulsion control means operable at another time to condition said rotor means for driving operation under the pressure of fluid in said reservoir.

BURTON S. AIKMAN.